(12) United States Patent
Lee

(10) Patent No.: US 11,870,039 B2
(45) Date of Patent: Jan. 9, 2024

(54) ELECTRODE ASSEMBLY AND METHOD FOR MANUFACTURING THE SAME

(71) Applicant: LG Energy Solution, Ltd., Seoul (KR)

(72) Inventor: Han Young Lee, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/770,828

(22) PCT Filed: Feb. 26, 2021

(86) PCT No.: PCT/KR2021/002512
§ 371 (c)(1),
(2) Date: Apr. 21, 2022

(87) PCT Pub. No.: WO2021/177681
PCT Pub. Date: Sep. 10, 2021

(65) Prior Publication Data
US 2022/0384851 A1    Dec. 1, 2022

(30) Foreign Application Priority Data

Mar. 4, 2020  (KR) .................. 10-2020-0027431

(51) Int. Cl.
*H01M 10/00* (2006.01)
*H01M 10/0583* (2010.01)
*H01M 10/04* (2006.01)

(52) U.S. Cl.
CPC ... *H01M 10/0583* (2013.01); *H01M 10/0454* (2013.01); *H01M 10/0459* (2013.01)

(58) Field of Classification Search
CPC ......... H01M 10/0538; H01M 10/0454; H01M 10/0459
See application file for complete search history.

(56) References Cited

U.S. PATENT DOCUMENTS 5,147,737 A * 9/1992 Post .................. H01M 10/0454
429/246
5,958,088 A    9/1999 Vu et al.
(Continued)

FOREIGN PATENT DOCUMENTS

CN    103959540 A    7/2014
CN    104584307 A    4/2015
(Continued)

OTHER PUBLICATIONS

Wi et al. Electrode Assembly and Method for Manufacturing Same, WO 2018174370 A1, Sep. 2018. See Figure 1. (Year: 2018).*
(Continued)

*Primary Examiner* — Cynthia H Kelly
*Assistant Examiner* — Monique M Wills
(74) *Attorney, Agent, or Firm* — Lerner David LLP

(57) ABSTRACT

An electrode assembly according to an embodiment of the present invention for achieving the above object comprises: a first electrode formed in the form of a single sheet and repetitively in-folded and out-folded at a predetermined interval; a second electrode formed into a plurality of pieces and respectively interposed in spaces formed by folding the first electrode; and a separator formed in the form of a single sheet and interposed between the first electrode and the second electrode so as to be repetitively in-folded and out-folded at a predetermined interval together with the first electrode, wherein the first electrode is a single-sided electrode in which a first electrode active material is applied to only one surface of a first electrode collector, and the second electrode is a double-sided electrode in which a second electrode active material is applied to all both surfaces of a second electrode collector.

10 Claims, 8 Drawing Sheets

(56) References Cited

U.S. PATENT DOCUMENTS

| | | |
|---|---|---|
| 8,318,346 B2 | 11/2012 | Kim et al. |
| 2002/0160263 A1 * | 10/2002 | Corrigan ................ H01M 4/32 |
| | | 429/218.2 |
| 2007/0154795 A1 | 7/2007 | Kim et al. |
| 2007/0202401 A1 | 8/2007 | Viavattine |
| 2011/0104567 A1 | 5/2011 | Lee |
| 2011/0143189 A1 | 6/2011 | Kim et al. |
| 2011/0274960 A1 | 11/2011 | Ahn |
| 2011/0305938 A1 | 12/2011 | Yamamoto et al. |
| 2014/0227583 A1 | 8/2014 | Do et al. |
| 2015/0044555 A1 | 2/2015 | Lee |
| 2015/0180082 A1 | 6/2015 | Jung et al. |
| 2015/0333361 A1 | 11/2015 | Sato et al. |
| 2016/0240325 A1 | 8/2016 | Tajima et al. |
| 2019/0237797 A1 | 8/2019 | Cho et al. |
| 2020/0220146 A1 | 7/2020 | Laramie et al. |
| 2020/0220149 A1 | 7/2020 | Laramie |
| 2020/0220197 A1 | 7/2020 | Laramie et al. |
| 2022/0278429 A1 | 9/2022 | Laramie et al. |
| 2023/0207908 A1 | 6/2023 | Laramie et al. |

FOREIGN PATENT DOCUMENTS

| | | | |
|---|---|---|---|
| CN | 209312928 U | 8/2019 | |
| JP | 2004-207119 A | 7/2004 | |
| JP | 2016-154138 A | 8/2016 | |
| JP | 2019-079711 A | 5/2019 | |
| KR | 20010041600 A | 5/2001 | |
| KR | 100719713 B1 | 5/2007 | |
| KR | 101084075 B1 | 11/2011 | |
| KR | 20110122378 A | 11/2011 | |
| KR | 20110135346 A | 12/2011 | |
| KR | 101156344 B1 | 6/2012 | |
| KR | 101387137 B1 | 4/2014 | |
| KR | 20170006633 A | 1/2017 | |
| KR | 20170019791 A | 2/2017 | |
| KR | 20180001458 A | 1/2018 | |
| KR | 101933950 B1 | 1/2019 | |
| KR | 101952594 B1 | 2/2019 | |
| KR | 20200018091 A | 2/2020 | |
| WO | WO-2018174370 A1 * | 9/2018 | ............ H01M 10/04 |
| WO | 2020-139802 A2 | 7/2020 | |

OTHER PUBLICATIONS

International Search Report for PCT/KR2021/002512 dated Jun. 7, 2021. 3 pgs.

Extended European Search Report for Application No. 21764834.4 dated Jul. 24, 2023. 7 pgs.

* cited by examiner

ELECTRODE ASSEMBLY AND METHOD FOR MANUFACTURING THE SAME

CROSS-REFERENCE TO RELATED APPLICATION

The present application is a national stage entry under 35 U.S.C. § 371 of International Application No. PCT/KR2021/002512, filed on Feb. 26, 2021, published in Korean, which claims priority to Korean Patent Application No. 10-2020-0027431, filed on Mar. 4, 2020, the entire contents of which are hereby incorporated herein by reference.

TECHNICAL FIELD

The present invention relates to an electrode assembly and a method for manufacturing the same, and more particularly, to an electrode assembly that is capable of preventing an electrode from being damaged, such as an occurrence of wrinkles or swells on the electrode due to a taping process or deintercalation of an active material of the electrode and a method for manufacturing the same.

BACKGROUND ART

In general, secondary batteries comprise nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture a secondary battery, an electrode assembly is accommodated in a battery case, and an electrolyte is injected, and then, the battery case is sealed. Also, in order to manufacture the electrode assembly, first, positive electrode active material slurry is applied to a positive electrode collector, and negative electrode active material slurry is applied to a negative electrode collector to manufacture a positive electrode and a negative electrode, respectively. A separator is interposed between the positive electrode and the negative electrode to manufacture the electrode assembly. Such electrode assemblies are classified into various types. For example, the various types of electrode assemblies comprise a simple stack type electrode assembly, in which positive electrodes, separators, negative electrodes are simply intersected and stacked continuously without manufacturing a unit cell, a lamination & stack (L&S) type electrode assembly, in which unit cells are manufactured first using positive electrodes, separators, and negative electrodes and then are stacked, and a stack & folding (S&F) type, in which a plurality of unit cells are attached at a predetermined interval on one surface of a separator film having a long length and repetitively folded from an one end of the separator film in the same direction.

FIG. 1 is a perspective view of an electrode assembly 30 according to the related art, and FIG. 2 is a front view of the electrode assembly 30 according to the related art.

The existing simple stack type or lamination & stack type electrode assembly 30 has a simple structure and a high degree of impregnation of an electrolyte, but has a problem in that the production speed is slow, and a degree of alignment is lowered. In order to maintain the alignment of the plurality of stacked electrodes and separators of the electrode assembly 30, a taping process is performed. Then, as illustrated in FIG. 1, the tape 31 is attached to each of both surfaces and portions of the top and bottom surfaces of the electrode assembly 30.

However, in the simple stack type or lamination and stack type electrode assembly 30, each of the negative electrode and the separator has a width that is relatively wider than that of the positive electrode. Therefore, since a peripheral portion protrudes to the outside, if the tape 31 is attached, there is a problem in that the electrode is damaged, such as an occurrence of wrinkles or swells or eintercalation of an active material of the electrode.

In addition, the tape 31 may be detached later in an electrolyte injection process or degassing process. Particularly, since a gas within the case has to be discharged to the outside in the degassing process, there is a problem in that the tape 31 is more easily detached by a flow of the gas.

The stack & folding electrode assembly has a high production speed and high structural stability, but there is a problem in that the process is complicated, and the degree of alignment and the degree of impregnation of the electrolyte are lowered.

DISCLOSURE OF THE INVENTION

Technical Problem

An object of the prevent invention for solving above problems is to provide an electrode assembly that is capable of preventing an electrode from being damaged, such as an occurrence of wrinkles or swells on the electrode due to a taping process or deintercalation of an active material of the electrode and a method for manufacturing the same.

The objects of the present invention are not limited to the aforementioned object, but other objects not described herein will be clearly understood by those skilled in the art from descriptions below.

Technical Solution

An electrode assembly according to an embodiment of the present invention for achieving the above object comprises: a first electrode formed in the form of a single sheet and repetitively in-folded and out-folded at a predetermined interval; a second electrode formed into a plurality of pieces and respectively interposed in spaces formed by folding the first electrode; and a separator formed in the form of a single sheet and interposed between the first electrode and the second electrode so as to be repetitively in-folded and out-folded at a predetermined interval together with the first electrode, wherein the first electrode is a single-sided electrode in which a first electrode active material is applied to only one surface of a first electrode collector, and the second electrode is a double-sided electrode in which a second electrode active material is applied to all both surfaces of a second electrode collector.

Also, the second electrode may be interposed only in each of spaces formed by in-folding the first electrode.

Also, the separator may be interposed between one surface of the first electrode, to which the first electrode active material is applied, and the second electrode.

Also, an insulating part formed in the form of a single film may be disposed on the other surface of the first electrode, on which the separator is not disposed.

Also, the insulating part may comprise at least one of polyethylene terephthalate (PET), polypropylene (PP), or polytetrafluoroethylene (PTFE).

A method for manufacturing an electrode assembly according to an embodiment of the present invention for achieving the above object comprises: a step of stacking a separator formed in the form of a single sheet on one surface of a first electrode formed in the form of a single sheet in the same direction; a step of seating a second electrode, which is formed into a plurality of pieces, at a predetermined interval on the separator so as to form an electrode stack; and a step of in-folding and out-folding the first electrode and the separator to fold the electrode stack, wherein the first electrode is a single-sided electrode in which a first electrode active material is applied to only one surface of a first electrode collector, and the second electrode is a double-sided electrode in which a second electrode active material is applied to all both surfaces of a second electrode collector.

Also, in the step of stacking the separator, the separator is stacked on one surface on which the first electrode active material may be applied on the first electrode.

Also, the predetermined interval may be longer than a length of the second electrode.

Also, the method may further comprise, before folding the electrode stack, a step of applying an insulating material on the other surface of the first electrode, on which the first electrode active material is not applied, and drying the applied insulating material to form an insulating part.

Also, the step of forming the insulating part may be performed before the step of seating the second electrode.

Also, in the step of folding the electrode stack, each of areas of the first electrode and the separator, on which one end of the second electrode is disposed, may be in-folded, and each of areas of the first electrode and the separator, on which the other end of the second electrode is disposed, may be out-folded.

Particularities of other embodiments are comprised in the detailed description and drawings.

Advantageous Effects

According to the embodiments of the present invention, there are at least the following effects.

Since the first electrode is formed in the form of a single sheet, it is unnecessary to fix the electrode assembly by using the tape, and thus, the electrode may be prevented from being damaged, such as the occurrence of the wrinkles or the swells on the electrode or the deintercalation of the active material of the electrode.

In addition, since the first electrode is the single-sided electrode, the unnecessary electrode active material may not be formed on the outermost side of the electrode assembly to improve the energy density relative to the volume.

In addition, since it is unnecessary to manufacture a unit cell first, a continuous process may be easy, and a process time may be saved.

The effects of the prevent invention are not limited by the aforementioned description, and thus, more varied effects are involved in this specification.

MODE FOR CARRYING OUT THE INVENTION

Figure 1:
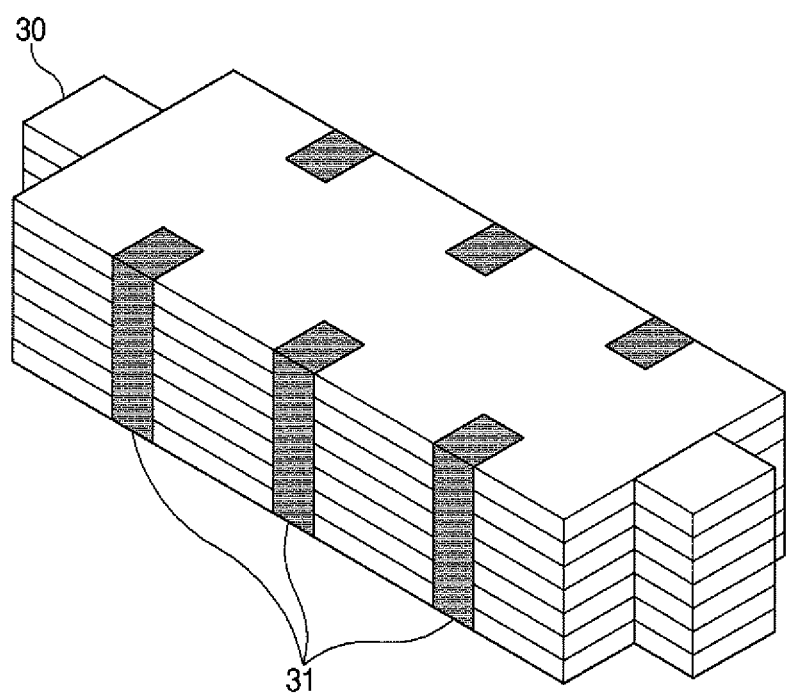
FIG. 1 is a perspective view of an electrode assembly according to a related art.
Figure 2:
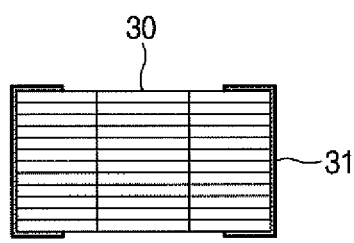
FIG. 2 is a front view of the electrode assembly according to the related art.

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (comprising technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 3:
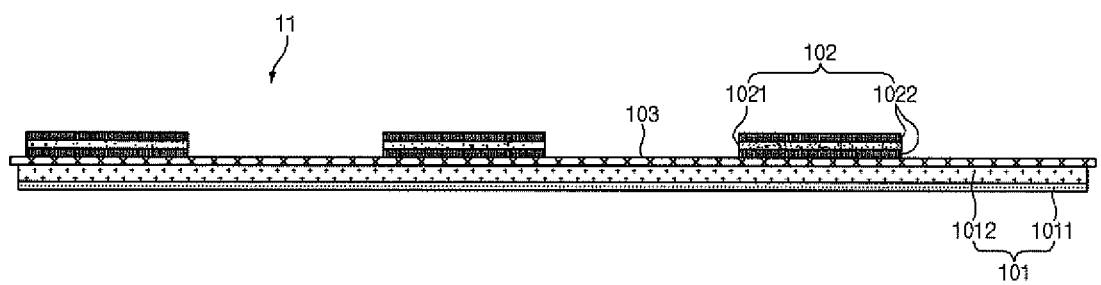
FIG. 3 is a schematic view illustrating an electrode stack according to an embodiment of the present invention.

FIG. 3 is a schematic view illustrating an electrode stack 11 according to an embodiment of the present invention.

According to an embodiment of the present invention, since a first electrode 101 is formed in the form of a single sheet, it is unnecessary to fix the electrode to the electrode assembly by using a tape, thereby preventing the electrode from being damaged, such as an occurrence of wrinkles or swells on the electrode or deintercalation of an active material of the electrode. In addition, since the first electrode 101 is the single-sided electrode, an unnecessary electrode active material may not be formed on the outermost side of the electrode assembly 10 to improve an energy density relative to a volume. In addition, since it is unnecessary to manufacture a unit cell first, a continuous process may be easy, and a process time may be saved.

For this, a method for manufacturing the electrode assembly 10 according to an embodiment of the present invention comprises: a step of stacking the separator 103 formed in the form of a single sheet on one surface of the first electrode 101 formed in the form of a single sheet in the same direction; a step of seating a second electrode 102, which is formed into a plurality of pieces, at a predetermined interval on the separator 103 so as to form an electrode stack 11; and a step of in-folding and out-folding the first electrode 101 and the separator 103 to fold the electrode stack 11, wherein the first electrode 101 is a single-sided electrode in which a first electrode active material 1012 is applied to only one surface of a first electrode collector 1011, and the second electrode 102 is a double-sided electrode in which a second electrode active material 1022 is applied to all both surfaces of a second electrode collector 1021.

The electrode assembly 10 manufactured through the above-described method according to an embodiment of the present invention comprises: a first electrode 101 formed in the form of a single sheet and repetitively in-folded and out-folded at a predetermined interval; a second electrode 102 formed into a plurality of pieces and respectively interposed in spaces formed by folding the first electrode 101; and a separator 103 formed in the form of a single sheet and interposed between the first electrode 101 and the second electrode 102 so as to be repetitively in-folded and out-folded at a predetermined interval together with the first electrode 101, wherein the first electrode 101 is a single-sided electrode in which a first electrode active material 1012 is applied to only one surface of a first electrode collector 1011, and the second electrode 102 is a double-sided electrode in which a second electrode active material 1022 is applied to all both surfaces of a second electrode collector 1021.

As described above, in order to manufacture the electrode assembly 10, first, positive electrode active material slurry is applied to a positive electrode collector, and negative electrode active material slurry is applied to a negative electrode collector to manufacture a positive electrode and a negative electrode, respectively. The separator 103 is interposed between the positive electrode and the negative electrode, and the separator 103 and the electrodes may be stacked to manufacture the electrode assembly 10.

Both the electrodes of the positive and negative electrodes used in the present invention are not particularly limited, and the electrode active material may be prepared in a shape that is bonded to the electrode collector according to the typical method that is known in the art. Here, the positive electrode may be manufactured by, for example, applying slurry, in which a positive electrode active material, a conductive agent, and a binder are mixed, onto a positive electrode collector, and then drying and pressing the slurry. At this time, if necessary, the slurry may further comprise a filler. The positive electrode may be manufactured in the form of a sheet and mounted on a roll.

The positive electrode collector generally has a thickness of 3 μm to 500 μm. The positive electrode collector is usually made of a material having high conductivity without causing a chemical change. Such a material may be surface-treated with, for example, stainless steel, aluminum, nickel, titanium, calcined carbon, or aluminum or stainless steel on which carbon, nickel, titanium, silver, or the like is surface-treated on a surface thereof, but is not limited thereto. Also, the positive electrode collector may form a fine unevenness on a surface thereof to increase in adhesion of the positive electrode active material. Also, the positive electrode collector may have various shapes such as a film, a sheet, a foil, a net, a porous body, a foam, a non-woven fabric, and the like.

In a case of a lithium secondary battery, the positive electrode active material may comprise, for example, a layered compound of lithium cobalt oxide ($LiCoO_2$), lithium nickel oxide ($LiNiO_2$), etc., or a substituted compound with one or more transition metals; lithium manganese oxide such as $Li_{1+x}Mn_{2-x}O_4$ (x is 0 to 0.33), $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$, etc.; Ni site-type lithium nickel oxide represented by Chemical Formula of $LiNi_{1-x}M_xO_2$ (M=Co, Mn, Al, Cu, Fe, Mg, B or Ga, and x=0.01 to 0.3); lithium manganese complex oxide represented by Chemical Formula $LiMn_{2-x}M_xO_2$ (M=Co, Ni, Fe, Cr, Zn or Ta, and x=0.01 to 0.1) or $Li_2Mn3MO8$ (M=Fe, Co, Ni, Cu or Zn); $LiMn_2O_4$ in which a portion of Li is substituted with alkaline earth ions; a disulfide compound; $Fe_2(MoO_4)_3$, and the like. However, this embodiment is not limited thereto.

The conductive agent is generally added at 1 wt % to 50 wt % based on the total weight of the mixture comprising the positive electrode active material. The conductive agent is usually made of a material having conductivity without causing a chemical change. The conductive agent may comprise, for example, conductive materials such as: graphite such as natural graphite and artificial graphite; carbon black such as acetylene black, Ketjen black, furnace black, channel black, lamp black, and thermal black; conductive fiber such as carbon fiber and metal fiber; metal powder such as carbon fluorine, aluminum, and nickel powder; conductive whisker such as zinc oxide and potassium titanate; conductive oxide such as titanium oxide; or polyphenylene derivatives.

The binder is a component assisting the bonding of the active material to the conductive agent and the bonding to the collector and is commonly added at 1 wt % to 50 wt % based on the total weight of the mixture comprising the positive electrode active material. Examples of the binder may comprise polyfluoro vinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated EPDM, styrene butadiene rubber, fluorine rubber, various copolymers, and the like.

The filler is optionally used as a component that inhibits expansion of the positive electrode. Also, a general filler may be used if the filler is a fibrous material without causing the chemical change. Examples of the filler may comprise olefin polymers such as polyethylene and polypropylene; and fibrous materials such as glass fibers and carbon fibers.

The negative electrode may be manufactured by, for example, applying the negative electrode active material onto the negative electrode collector and then drying and pressing the negative electrode active material. If necessary, the negative electrode active material may optionally comprise the conductive agent, the binder, the filler, and the like. The negative electrode may be manufactured in the form of a sheet and mounted on a roll.

The negative electrode collector generally has a thickness of 3 μm to 500 μm. The negative electrode collector is usually made of a material having conductivity without causing a chemical change. Examples of the material comprise copper, stainless steel, aluminum, nickel, titanium, calcined carbon, copper or stainless steel on which carbon, nickel, titanium, silver, or the like is surface-treated on a surface thereof, or aluminum-cadmium alloys. Also, the negative electrode collector may form a fine unevenness on the surface thereof to increase in bonding force of the negative electrode active material. Also, the negative electrode collector may have various shapes such as a film, a sheet, a foil, a net, a porous body, a foam, or a non-woven fabric.

The negative electrode active material may comprise, for example, carbon such as non-graphitized carbon, graphite-based carbon, etc.; a metal complex oxide such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, elements found in Group 1, Group 2 and Group 3 in a periodic table, halogen; 0<x≤1; 1≤y≤3; 1≤z≤8), etc.; a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene, etc.; Li—Co—Ni-based material, and the like.

A commonly known polyolefin-based separator 103 or a composite separator 103 in which an organic and inorganic composite layer is formed on the olefin-based material may be used as the separator 103, which is disposed between the positive electrode and the negative electrode to insulate the electrodes from each other, but is not particularly limited.

The electrode assembly 10 having the above structure is accommodated in a battery case. Then, an electrolyte is injected, and the battery case is sealed to manufacture a secondary battery.

According to an embodiment of the present invention, the first electrode 101 may be a positive electrode, and the second electrode 102 may be a negative electrode, but are not limited thereto. For example, the first electrode 101 may be a negative electrode, and the second electrode 102 may be a positive electrode.

First, as illustrated in FIG. 3, one separator 103 formed in the form of a single sheet is stacked on one surface of the first electrode 101 formed in the form of a single sheet in the same direction. Here, the first electrode 101 is a single-sided electrode in which a first electrode active material 1012 is applied to only one surface of a first electrode collector 1011. Thus, the first electrode active material 1012 is formed on one surface of the first electrode 101, and the first electrode active material 1012 is not formed on the other surface of the first electrode 101. As a result, the first electrode collector 1011 is exposed to the outside. The separator 103 formed in the form of a single sheet is preferably stacked on one surface of the first electrode 101 to which the first electrode active material 1012 is applied.

Then, the second electrodes 102, which are formed into the plurality of pieces, are seated to be spaced a predetermined interval from each other on the separator 103 to form an electrode stack 11. Here, the second electrode 102 is a double-sided electrode in which the second electrode active material 1022 is applied to all both surfaces of the second electrode collector 1021. Thus, the second electrode active material 1022 is formed on both one side and the other side of the second electrode 102.

It is preferable that the predetermined interval is longer than a length of the second electrode 102. If the predetermined interval is shorter than the length of the second electrode 102, when the electrode stack 11 is folded later, the second electrode 102 is not evenly aligned and thus protrudes outward. However, if the predetermined interval is longer than the length of the second electrode 102, the second electrode 102 is evenly aligned to reduce a volume, and an area on which the second electrode 102 and the first electrode 101 overlap each other increase to increase in energy density.

Figure 4:
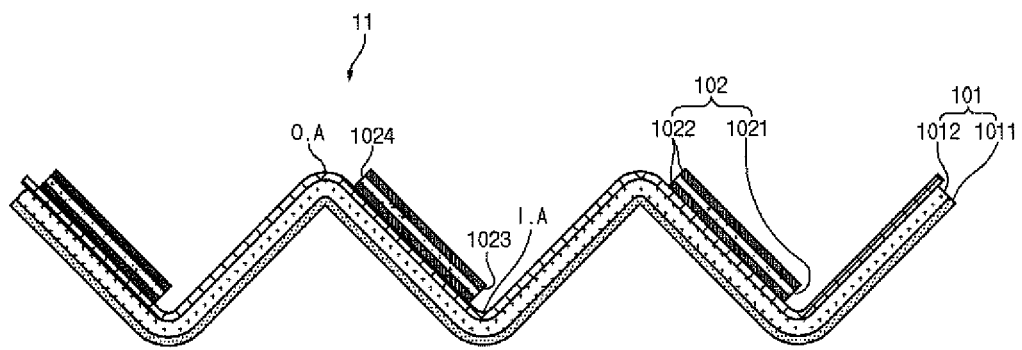
FIG. 4 is a schematic view illustrating a shape in which the electrode stack is folded according to an embodiment of the present invention.

FIG. 4 is a schematic view illustrating a shape in which the electrode stack 11 is folded according to an embodiment of the present invention.

As illustrated in FIG. 4, the electrode stack 11 is folded by in-folding and out-folding the first electrode 101 and the separator 103. That is, in the electrode stack 11, the sheet on which the first electrode 101 and the separator 103 are stacked is in-folded at one side and then out-folded in an opposite direction, and then, this process is alternately and repetitively performed. Also, the sheet is continuously folded from one side to the other side thereof. At this time, in the first electrode 101 and the separator 103, each of areas I.A on which one end 1023 of the second electrode 102 is disposed may be in-folded, and each of areas O.A on which the other end 1024 of the second electrode 102 may be out-folded. That is, the in-folding areas and the out-folding areas in the first electrode 101 and the separator 103 may be determined according to a position of the second electrode 102.

Herein, the in-folding refers to folding in a direction in which the first electrode 101 surrounds the second electrode 102. Thus, when the in-folding is performed, the separator 103 and the first electrode 101 are sequentially stacked on both the surfaces of the second electrode 102. Also, the out-folding refers to folding in a direction in which the first electrode 101 excludes the second electrode 102 as the contrary concept of the in-folding. Thus, when the out-folding is performed, the first electrode collectors 1011, which are exposed through the other surface of the first electrode 101, are stacked on each other.

Figure 5:
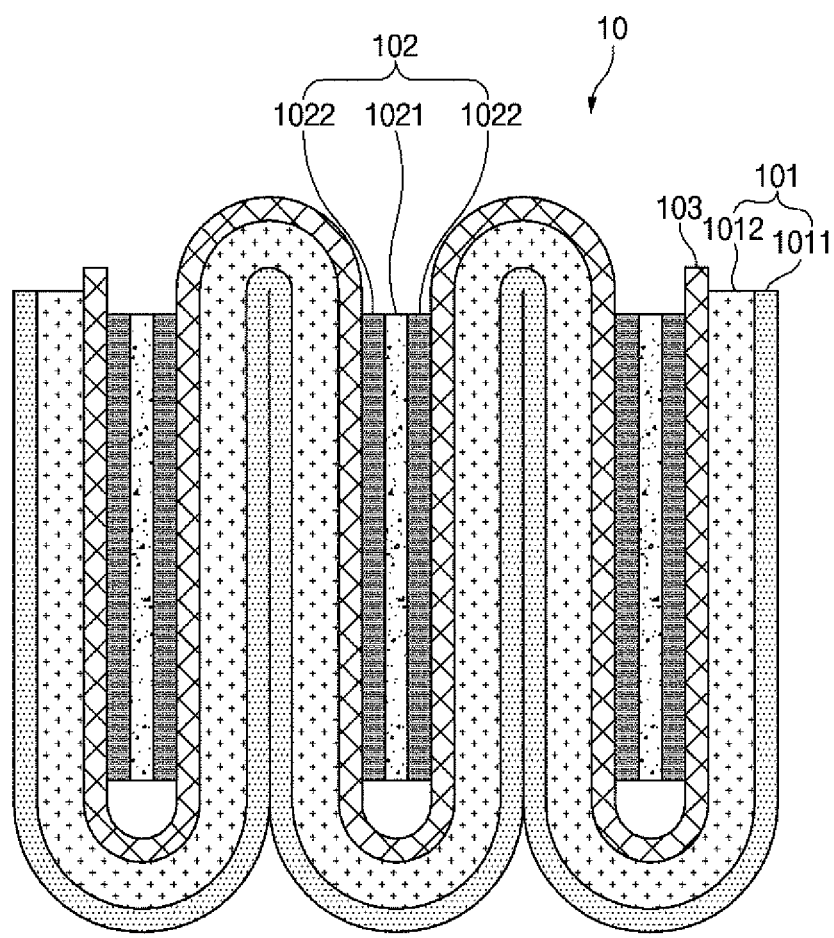
FIG. 5 is a schematic view of an electrode assembly according to an embodiment of the present invention.

FIG. 5 is a schematic view of the electrode assembly 10 according to an embodiment of the present invention.

As illustrated in FIG. 5, the electrode assembly 10 according to an embodiment of the present invention may be manufactured through the above-described method. The electrode assembly 10 comprises a first electrode 101, a second electrode 102, and a separator 103. The first electrode 101 is a single-sided electrode in which a first electrode active material 1012 is applied to only one surface of a first electrode collector 1011, and the second electrode 102 is a double-sided electrode in which a second electrode active material 1022 is applied to all both surfaces of a second electrode collector 1021.

The first electrode 101 is formed in the form of a single sheet and is repeatedly in-folded and out-folded at a predetermined interval. The second electrode 102 is formed into a plurality of pieces, which are interposed in spaces formed by folding the first electrode 101, respectively. Particularly, it is preferable that the second electrode 102 be interposed only in a space formed by in-folding the first electrode 101. The separator 103 is formed in the form of a single sheet, is interposed between the first electrode 101 and the second electrode 102, and repetitively in-folded and out-folded at a predetermined interval together with the first electrode 101. Particularly, the separator 103 is interposed between one surface of the first electrode 102, to which the first electrode active material 1012 is applied, and the second electrode 102.

In general, both the outermost surfaces of the electrode assembly are not used to generate electricity. However, in the electrode assembly 10 according to an embodiment of the present invention, as illustrated in FIG. 5, the first electrode collector 1011 of the first electrode 101, which is the single-sided electrode, is exposed on both the outermost surfaces. Thus, since the first electrode active material 1012 is not formed on both the outermost surfaces that do not generate electricity, the energy density may increase.

However, according to an embodiment of the present invention, since the electrode collectors are also stacked on each other at the out-folded portion of the first electrode 101, the out-folded portion is not used to generate electricity. However, in general, the electrode active material is much thicker than the electrode collector in the electrode. Thus, even if the out-folded portion of the first electrode 101 does not generate electricity, the thickness is much thinner to reduce the volume. That is, the energy density relative to the volume may be further improved.

In addition, since the first electrode 101 and the separator 103 are formed in the form of a single sheet, it is unnecessary to fix the electrode to the electrode assembly by using a tape, thereby preventing the electrode from being damaged, such as an occurrence of wrinkles or swells on the electrode or deintercalation of the active material of the electrode. In addition, since it is unnecessary to manufacture a unit cell first, a continuous process may be easy, and a process time may be saved.

Figure 6:
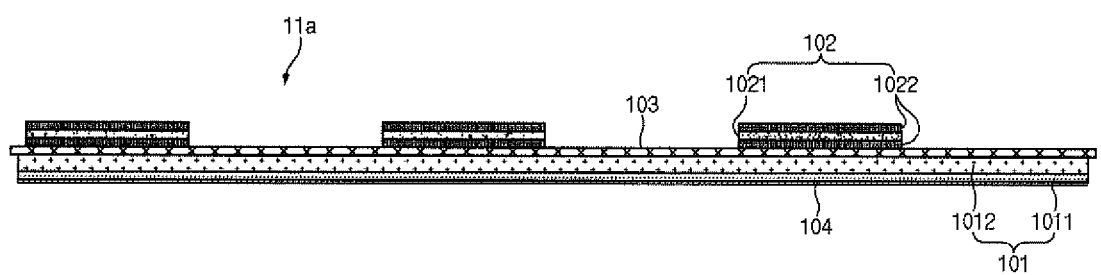
FIG. 6 is a schematic view of an electrode stack according to another embodiment of the present invention.

FIG. 6 is a schematic view of an electrode stack 11a according to another embodiment of the present invention.

While the secondary battery is actually used, an accident due to collision with the outside may occur. For example, a sharp object may pass through the secondary battery, and thus, the positive electrode and the negative electrode may be in direct contact with each other to cause short circuit. Due to the short circuit, a large amount of gas may be generated at a high speed in a short time, and a high temperature rise may occur. Furthermore, large explosion may occur to lead to a major accident.

According to another embodiment of the present invention, as illustrated in FIG. 6, before folding the electrode stack 11a, an insulating material may be applied to the other surface on which a first electrode active material 1012 is not applied in the first electrode 101 and then dried to form an insulating part 104. The insulating material may be a non-conductive non-conductor that does not conduct electricity well and may comprise at least one of polyethylene terephthalate (PET), polypropylene (PP), or polytetrafluoroethylene (PTFE).

The insulating part 104 may be formed just before folding the electrode stack 11a after forming the electrode stack 11a. However, it is preferable that the insulating part 104 is formed before the first electrode 101 and the separator 103 are stacked, and the second electrode 102 is seated. Furthermore, it is more preferable that the insulating part 104 is formed before the separator 103 is stacked on the first electrode 101. In order to apply the insulating material on the first electrode 101 and then dry the applied insulating material, top and bottom surfaces of the first electrode 101 have to be disposed to be inverted. That is, the insulating material has to be applied in a state in which one surface of the first electrode 101 faces a lower side, and the other surface of the first electrode 101 faces an upper side. This is done because, as the number of objects stacked on one surface of the first electrode 101 decreases, the process of inverting the first electrode 101 and the process of applying an insulating material are more easily performed.

Figure 7:
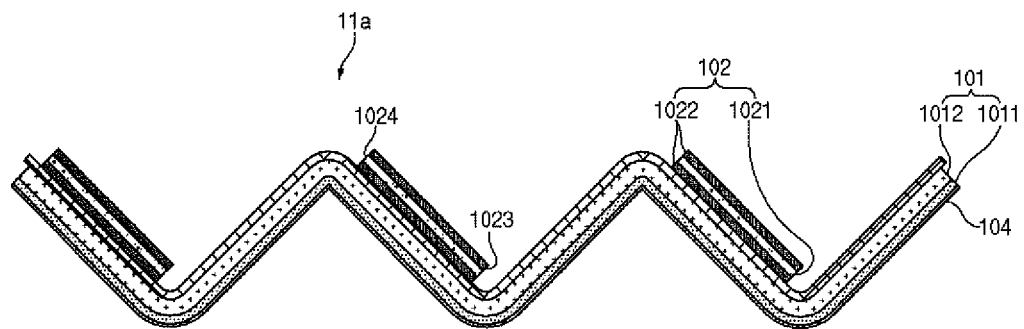
FIG. 7 is a schematic view illustrating a shape in which the electrode stack is folded according to another embodiment of the present invention.
Figure 8:
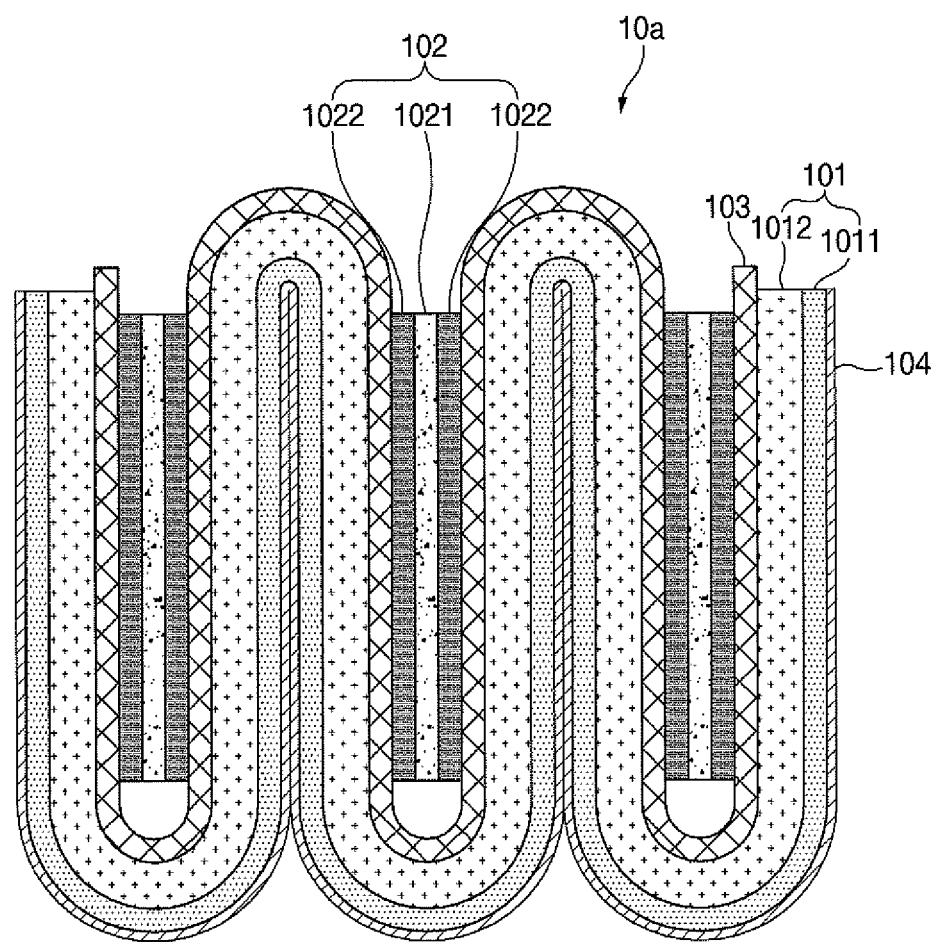
FIG. 8 is a schematic view of an electrode assembly according to another embodiment of the present invention.

FIG. 7 is a schematic view illustrating a shape in which the electrode stack is folded according to another embodiment of the present invention, and FIG. 8 is a schematic view of an electrode assembly according to another embodiment of the present invention.

As illustrated in FIG. 7, the electrode stack 11a is folded by in-folding and out-folding the first electrode 101 and the separator 103. As illustrated in FIG. 8, the electrode assembly 10a according to another embodiment of the present invention may be manufactured through the above-described method. In the first electrode 101 comprised in the electrode assembly 10a, an insulating part 104 formed in the form of a single film is disposed on the other surface on which the separator 103 is not disposed. In addition, the insulating part 104 may be a non-conductive non-conductor that does not conduct electricity well and may comprise at least one of polyethylene terephthalate (PET), polypropylene (PP), or polytetrafluoroethylene (PTFE). That is, in the other electrode assembly 10a according to the present invention, the insulating part 104 formed on the other surface of the first electrode 101, which is a single-sided electrode, is exposed to both the outermost surfaces. In addition, the insulating parts 104 are stacked on each other at the outfolded portion of the first electrode 101.

According to another embodiment of the present invention, even if a sharp nail passes through the secondary battery, the short circuit between the positive electrode and the negative electrode may be prevented to reduce heat generation and also reduce the risk of explosion.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

DESCRIPTION OF THE SYMBOLS 10, 30: Electrode assembly
11: Electrode stack
101: First electrode
1011: First electrode collector
1012: First electrode active material
102: Second electrode
1021: Second electrode collector
1022: Second electrode active material
1023: One end of second electrode
1024: The other end of second electrode
103: Separator
104: Insulating part
31: Tape

The invention claimed is:

1. An electrode assembly comprising:
a first electrode in the form of a single sheet that is repetitively in-folded and out-folded at a predetermined interval;
a plurality of second electrodes interposed in spaces formed by in-folding the first electrode; and
a separator in the form of a single sheet that is interposed between the first electrode and the plurality of second electrodes so as to be repetitively in-folded and out-folded at the predetermined interval together with the first electrode,
wherein the first electrode is a single-sided electrode in which a first electrode active material is applied to only a first surface of a first electrode collector, and a second surface of the first electrode collector opposite to the first surface does not have the first electrode active material thereon, the second surface of the first electrode collector having adjacent confronting portions that are in surface contact with one another, and
the plurality of second electrodes are each a double-sided electrode in which a second electrode active material is applied to first and second opposite surfaces of a second electrode collector, and each of the plurality of second electrodes is interposed only in a corresponding one of the spaces formed by in-folding the first electrode.

2. The electrode assembly of claim 1, wherein the separator is interposed between the first surface of the first electrode, to which the first electrode active material is applied, and each of the plurality of second electrodes.

3. An electrode assembly, comprising:
- a first electrode in the form of a single sheet that is repetitively in-folded and out-folded at a predetermined interval, the first electrode being a single-sided electrode in which a first electrode active material is applied to only a first surface of a first electrode collector and not to a second surface of the electrode collector opposite to the first surface;
- a plurality of second electrodes interposed in spaces formed by in-folding the first electrode, each of the plurality of second electrodes being interposed only in a corresponding one of the spaces formed by in-folding the first electrode;
- a separator in the form of a single sheet that is interposed between the first electrode and the plurality of second electrodes so as to be repetitively in-folded and out-folded at the predetermined interval together with the first electrode; and
- an insulating part in the form of a single film disposed on the second surface of the first electrode collector, the insulating part having adjacent confronting portions that are in surface contact with one another wherein the second surface of the first electrode collector has adjacent confronting portions that face one another with only the insulating part therebetween.

4. The electrode assembly of claim 3, wherein the insulating part comprises at least one of: polyethylene terephthalate (PET), polypropylene (PP), or polytetrafluoroethylene (PTFE).

5. A method for manufacturing an electrode assembly, the method comprising:
- stacking a separator in the form of a single sheet on a first surface of a first electrode in the form of a single sheet;
- seating a plurality of second electrodes on the separator, the plurality of second electrodes spaced from each other at a predetermined interval on the separator so as to form an electrode stack; and
- in-folding and out-folding the first electrode and the separator to fold the electrode stack,
- wherein the first electrode is a single-sided electrode in which a first electrode active material is applied to only a first surface of a first electrode collector, and a second surface of the first electrode collector opposite to the first surface does not have the first electrode active material thereon, the second surface of the first electrode collector having adjacent confronting portions that are in surface contact with one another, and
- the plurality of second electrodes are each a double-sided electrode in which a second electrode active material is applied to first and second opposite surfaces of a second electrode collector, and each of the plurality of second electrodes is interposed only in a corresponding one of the spaces formed by in-folding the first electrode.

6. The method of claim 5, wherein, during the stacking of the separator on the first electrode, the separator is stacked on the first surface of the first electrode on which the first electrode active material is applied.

7. The method of claim 5, wherein the predetermined interval is longer than a length of each of the plurality of second electrodes in a long direction of the separator.

8. The method of claim 5, further comprising, before the folding of the electrode stack, applying an insulating material on a second surface of the first electrode collector, the second surface of the first electrode collector being opposite the first surface of the first electrode collector, and drying the applied insulating material to form an insulating part.

9. The method of claim 8, wherein the forming of the insulating part is performed before the seating of the plurality of second electrodes.

10. The method of claim 5, wherein, during the folding of the electrode stack, each location of the first electrode and each location of the separator at which a first end of each of the plurality of second electrodes is disposed, is in-folded, and each location of the first electrode and each location of the separator at which a second end of each of the plurality of second electrodes is disposed, is out-folded.

* * * * *